(12) United States Patent
Takami et al.

(10) Patent No.: US 7,889,405 B2
(45) Date of Patent: Feb. 15, 2011

(54) IMAGE PROCESSING APPARATUS AND COMPUTER PROGRAM PRODUCT FOR OVERLAYING AND DISPLAYING IMAGES IN A STACK

(75) Inventors: Junichi Takami, Kanagawa (JP); Tetsuya Sakayori, Tokyo (JP); Iwao Saeki, Kanagawa (JP); Yoshinaga Kato, Kanagawa (JP); Yoshifumi Sakuramata, Tokyo (JP); Bin Lu, Tokyo (JP); Toshio Miyazawa, Kanagawa (JP); Yu Sekiguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1122 days.

(21) Appl. No.: 11/518,185

(22) Filed: Sep. 11, 2006

(65) Prior Publication Data

US 2007/0070470 A1    Mar. 29, 2007

(30) Foreign Application Priority Data

Sep. 15, 2005 (JP) .............................. 2005-268076
Jul. 18, 2006 (JP) .............................. 2006-196202

(51) Int. Cl.
*G03F 3/10* (2006.01)
*G06F 15/00* (2006.01)

(52) U.S. Cl. ...................... 358/527; 358/448; 358/1.13; 358/1.9; 358/1.18; 715/274; 715/277

(58) Field of Classification Search ................. 358/527, 358/448, 1.9; 399/81, 158; 715/273, 274, 715/277, 835; 345/629–641, 619; 348/584–601
See application file for complete search history.

(56) References Cited

U.S. PATENT DOCUMENTS 5,319,551 A * 6/1994 Sekiguchi et al. ........... 382/131

| 5,666,208 | A  |   | 9/1997 | Farrel et al. |
| 6,101,283 | A  | * | 8/2000 | Knox ........................ 382/254 |
| 6,262,732 | B1 | * | 7/2001 | Coleman et al. ............ 715/835 |
| 6,701,095 | B1 |   | 3/2004 | Fujimoto et al. |
| 6,927,865 | B1 | * | 8/2005 | Kujirai et al. .............. 358/1.12 |
| 6,950,613 | B2 |   | 9/2005 | Fujimoto et al. |
| 2001/0024195 | A1 |   | 9/2001 | Hayakawa |

(Continued)

FOREIGN PATENT DOCUMENTS

EP    0 915 414 A2    5/1999

(Continued)

OTHER PUBLICATIONS

U.S. Appl. No. 11/519,882, filed Sep. 13, 2006, Sakuramata, et al.

*Primary Examiner*—Dennis Dicker
(74) *Attorney, Agent, or Firm*—Oblon, Spivak, McClelland, Maier & Neustadt, L.L.P.

(57) ABSTRACT

A finished-image generating unit generates a finished image showing a result of a process performed on a target image. A transparent-finished-image generating unit generates, when the target image extends to a plurality of pages, a transparent finished image by adjusting a transparency of a non-image portion of the finished image to a predetermined transparency. A transparent-finished-image display unit forms the transparent finished image in a stack, and displays the stacked transparent finished image on a display unit in such a manner that an image portion of the transparent finished image is seen through the non-image portion.

17 Claims, 15 Drawing Sheets

U.S. PATENT DOCUMENTS

| | | | |
|---|---|---|---|
| 2002/0090119 A1* | 7/2002 | Saito et al. | 382/128 |
| 2003/0084114 A1 | 5/2003 | Simpson et al. | |
| 2003/0140315 A1* | 7/2003 | Blumberg et al. | 715/527 |
| 2004/0207859 A1 | 10/2004 | Kadoi et al. | |
| 2005/0180645 A1* | 8/2005 | Hasegawa et al. | 382/239 |
| 2007/0008566 A1* | 1/2007 | Leone et al. | 358/1.13 |
| 2007/0139707 A1* | 6/2007 | Takami et al. | 358/1.15 |

FOREIGN PATENT DOCUMENTS

| | | |
|---|---|---|
| JP | 11-234503 | 8/1999 |
| JP | 2000-185446 | 7/2000 |
| JP | 2002-103726 | 4/2002 |
| JP | 2003-5471 | 1/2003 |

* cited by examiner

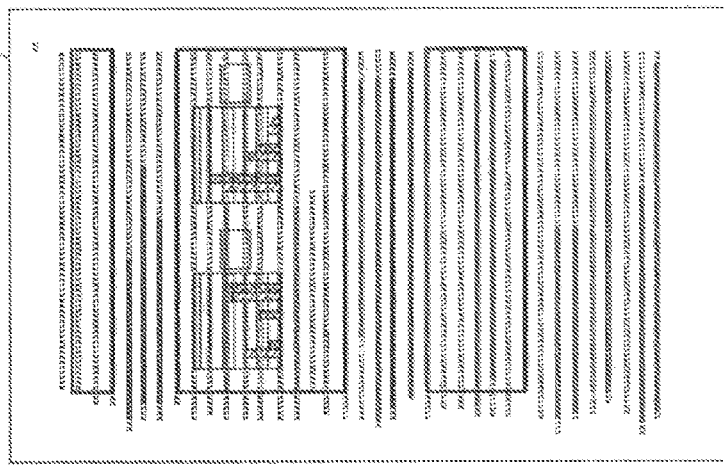
FIG. 11 — PAGE 4
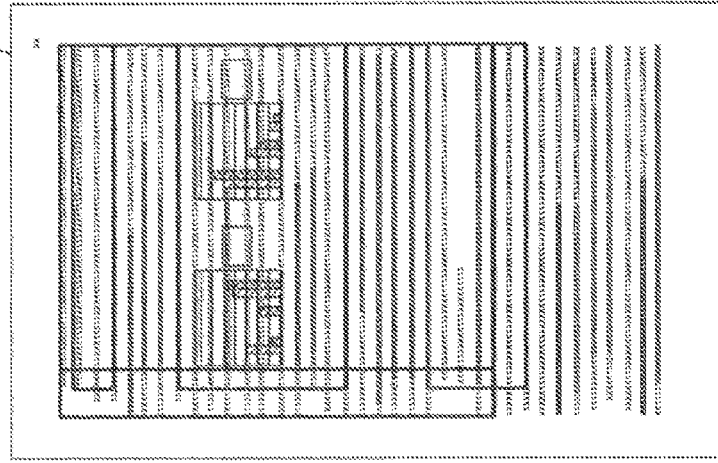
FIG. 12 — PAGE 6
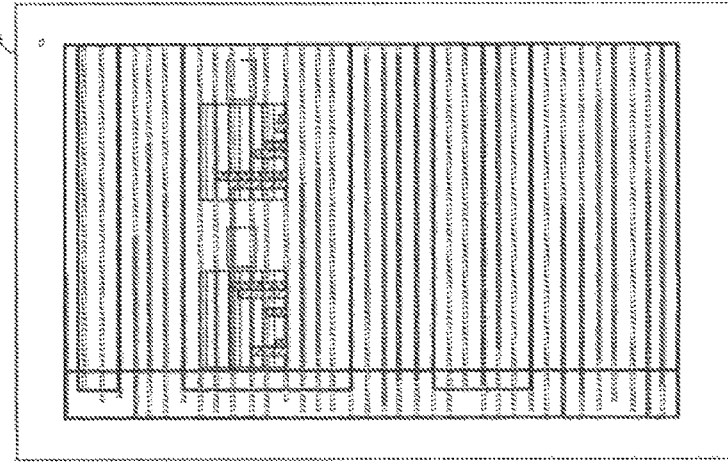
FIG. 13 — PAGE 8

US 7,889,405 B2

IMAGE PROCESSING APPARATUS AND COMPUTER PROGRAM PRODUCT FOR OVERLAYING AND DISPLAYING IMAGES IN A STACK

CROSS-REFERENCE TO RELATED APPLICATIONS

The present document incorporates by reference the entire contents of Japanese priority document, 2005-268076 filed in Japan on Sep. 15, 2005 and 2006-196202 filed in Japan on Jul. 18, 2006.

BACKGROUND OF THE INVENTION

1. Field of the Invention

The present invention relates to an image processing apparatus and a computer product.

2. Description of the Related Art

In using an image processing apparatus, such as a copier, fax machine, printer, and a multifunction product (MFP) having combined functions of copying, faxing, printing, a user has to selects a function to execute from functions the image processing apparatus offers, and to make setting for desired functional contents. For example, the user needs to make setting on the condition of a document, such as the type and the density of the document, on various image processes, such as zoom, single-side/double-side printing, and margin size adjustment, and on postprocessing, such as sorting, stapling, and punching.

A conventional image processing apparatus provides enormous numbers of setting items and a plurality of setting contents for each item to allow a user to execute a variety of setting. The user, who wants to obtain a desired result, selects a type of setting out of those enormous setting items and contents.

The user, however, has no way to know what kind of a process result to receive according to setting contents in, using the conventional image processing apparatus. For example, the user has to wait for actual print-out from the image processing apparatus to know a print result for the user. The obtained print result often ends up in a kind of finished product that the user does not expect to get.

To solve the above problem, some apparatuses and systems have been proposed, which include a preview display apparatus. (see, for example, Japanese Patent Application Laid-Open No. 2003-5471) that displays a preview image showing the state of a printed result, an image processing apparatus (see, for example, Japanese Patent Application Laid-Open No. 2002-103726), that displays a preview image showing image data printed on a paper corresponding to selected paper image data when the paper image data to express a paper style of a different paper quality is selected, and an image forming system (see, for example, Japanese Patent Application Laid-Open No. H11-234503) that displays a preview image of data made by synthesizing a plurality of edited and processed image data.

These conventional techniques offer a function of only displaying a preview of a single image, or an image synthesized from a plurality of images, that shows the result of image processes executed according to setting contents.

A user checks such preview images to make setting again for correction, which allows the user to perform setting operation while checking an image for a finished condition before proceeding to a print-out process, and finally obtain desired image output.

Those conventional techniques, however, have such a disadvantage in usability that a paging operation is required to turn pages one by one to find the overall structure of an image consisting of a plurality of pages or to find a specific image to check when the image consists of a number of pages of images, because each of the above conventional techniques features only the function of displaying a preview of a single image or an image synthesized from a plurality of images that shows the result of image processes executed according to setting contents.

SUMMARY OF THE INVENTION

It is an object of the present invention to at least partially solve the problems in the conventional technology.

An image processing apparatus according to one aspect of the present invention includes a finished-image generating unit that generates a finished image showing a result of a process performed on a target image according to various function setting items; a transparent-finished-image generating unit that generates, when the target image extends to a plurality of pages, a transparent finished image by adjusting a transparency of a non-image portion of each of the pages of the finished image to a predetermined transparency; and a transparent-finished-image display unit that forms the transparent finished image in a stack, and displays the stacked transparent finished image on a display unit in such a manner that an image portion of the transparent finished image is seen through the non-image portion.

A computer program product according to another aspect of the present invention includes a computer usable medium having computer program codes embodied in the medium that when executed causes a computer to execute generating a finished image showing a result of a process performed on a target image according to various function setting items; generating, when the target image extends to a plurality of pages, a transparent finished image by adjusting a transparency of a non-image portion of each of the pages of the finished image to a predetermined transparency; and transparent-finished-image displaying including forming the transparent finished image in a stack, and displaying the stacked transparent finished image on a display unit in such a manner that an image portion of the transparent finished image is seen through the non-image portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a front view of one example of a partial pages transparent finished image;

FIG. 12 is a front view of another example of a partial pages transparent finished image;

FIG. 13 is a front view of still another example of a partial pages transparent finished image;

DETAILED DESCRIPTION OF THE PREFERRED EMBODIMENTS

Exemplary embodiments of the present invention will be explained in detail below with reference to the accompanying drawings. Since the embodiments to be described below are provided as the preferred embodiments according to the present invention, various limitations preferable in terms of technical purposes are added to the embodiments. The scope of the present invention, however, is not limited to the description of the embodiments to follow unless the following description presents any particular statement that limits the scope of the invention.

A first embodiment of the present invention represents a case where an MFP is used as an image processing apparatus. The MFP has combined functions of copying, faxing, printing, scanning, and of distributing an input image (read document image given by a scanner function, input image given by a printer or fax function, etc.).

Figure 1:
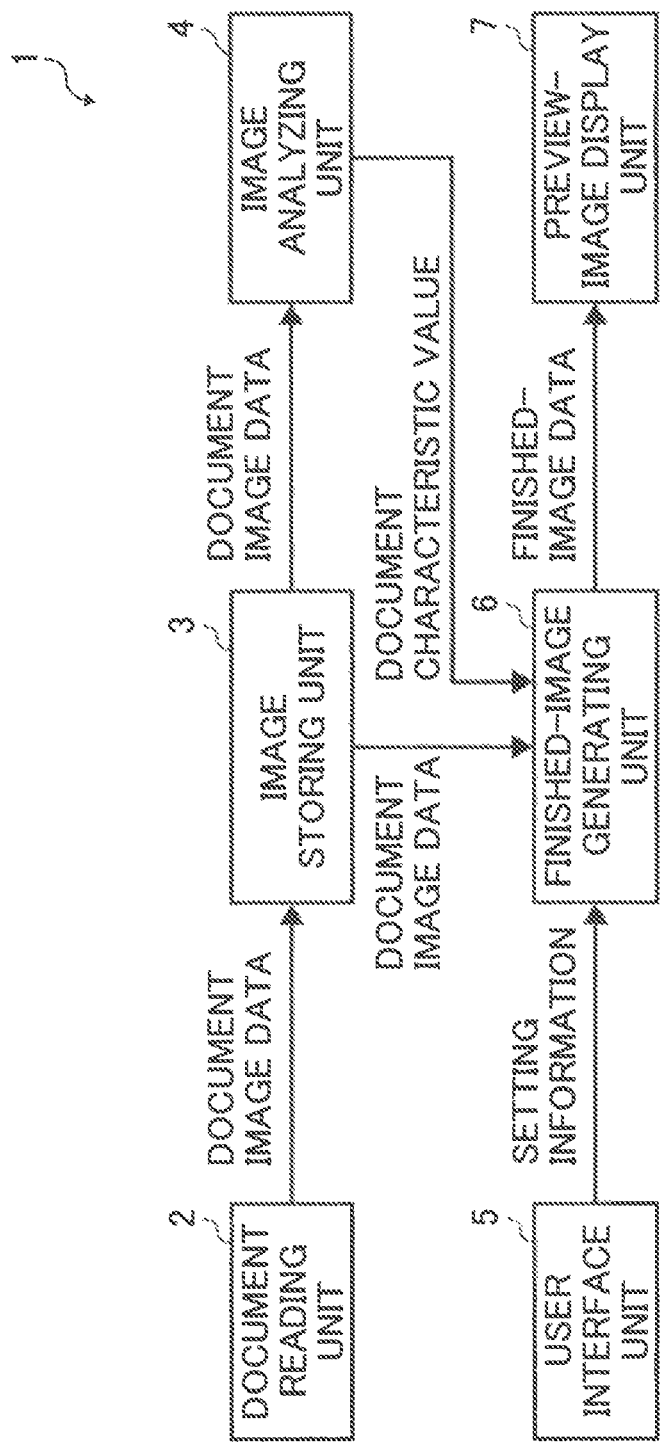
FIG. 1 is a block diagram of the main components of an image processing apparatus according to a first embodiment of the present invention.

Each of FIGS. 1 to 14 is a graphic diagram of the first embodiment of the image processing apparatus according to the present invention. FIG. 1 is a block diagram of the main components of an image processing apparatus 1 to which the first embodiment of the image processing apparatus according to the present invention is applied.

As shown in FIG. 1, the image processing apparatus 1 includes a document reading unit 2, an image storing unit 3, an image analyzing unit 4, a user interface unit 5, a finished-image generating unit 6, and a preview-image display unit 7. The image processing apparatus 1 further includes an image processing unit (not shown), a printing unit, and a post-processing unit, and can be used as a fax machine, a copier, a printer, a compound machine, etc. *The document reading unit 2 reads an image on a document and converts read image into digital image data by emitting reading light on the document, which travels relatively in a subscanning direction, and causing a photoelectric conversion element, such as a charge coupled device (CCD), to photoelectrically convert reflected light from the document. The document reading unit 2 then puts out the digital image data to the image storing unit 3. When the document reading unit 2 is provided with an automatic document feeder (ADF), which sends out a plurality of documents set in the ADF one by one, the document reading unit 2 sequentially reads documents sent from the ADF, and delivers read contents as image data to the image storing unit 3.

The image storing unit 3 consists of a large-capacity memory medium, such as large-capacity random access memory (RAM) or hard disc, and classifies image data read by the document reading unit 2 into each file to store.

The image analyzing unit 4 analyzes a document file stored in the image storing unit 3 employing, for example, an optical character recognition process, etc., to calculate the characteristic values of the document file, and puts out a calculation result as document characteristic values to the finished-image generating unit 6. The document characteristic values can be roughly divided into a document state characteristic value, an image characteristic value, and a layout characteristic value. The document state characteristic value is, for example, given by digitizing characteristics regarding the number of documents (the number of pages), a document side (distinction between double-side document and single-side document), etc. The image characteristic value is given by digitizing characteristics regarding the type of an image (characters, photographs, illustration, or a mixture of these elements), a used color (monochrome, color, the number of colors), an image density on a document, a pixel density (the ratio of the area of a pixel-containing part to the total area of a document), a used character size, etc. The layout characteristic value is given by digitizing characteristics regarding a document direction (the positional relation between the upper/lower and left/right parts of a document), a document size, a margin size at the upper/lower and left/right parts of a document, layout information (multi-column document or not), etc.

The user interface unit (operation unit) 5 includes various operating keys, and a touch panel arranged on the preview-image display unit (e.g. liquid crystal display) 7 serving as a display unit. Various operations necessary for operating the image processing apparatus 1 are executed on the operational keys and the touch panel. Particularly, a variety of setting operations are carried out using the operational keys and touch panel, the setting operations including setting on an image process and print conditions for a document image and on a post-process for a document that user desires to print out.

When various setting is made for printing on the user interface unit 5, for example, functions to execute are displayed as setting items (menu items) on the preview-image display unit 7. A user then selects any desired setting item from the setting items, and gives display input to determine a set value (set contents) for the selected setting item. The setting items include, for example, various setting items for reading conditions at the document reading unit 2 according to the state of a document, for the contents of an image process at the image processing unit (not shown) that processes read image data (e.g. adjustment of sharpness, color, etc.), for print conditions at the print unit (not shown), and for such a post-process as sorting, stapling, and punching that is executed on a printed matter at the post-process unit (not shown).

Figure 2:
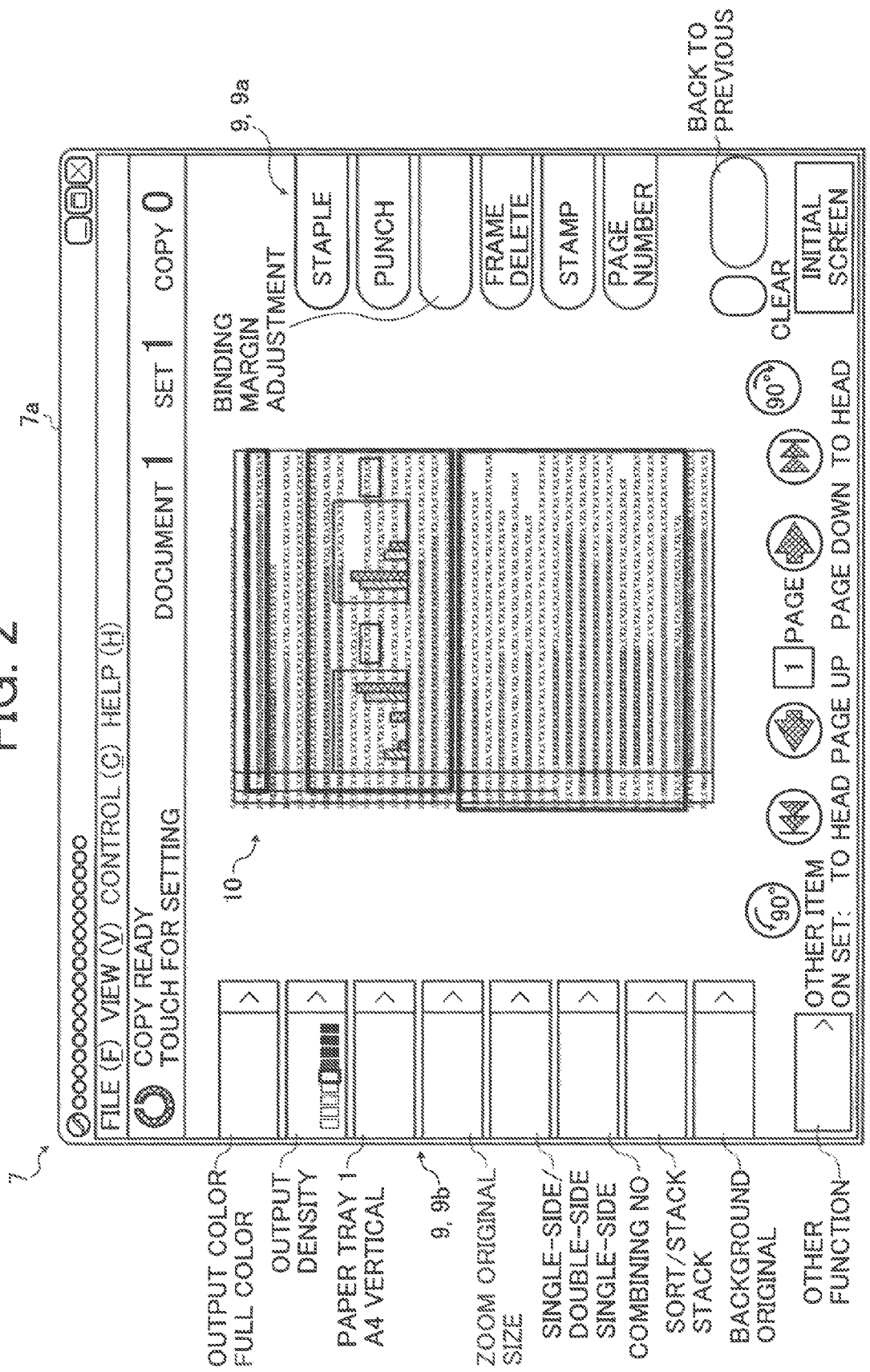
FIG. 2 is a front view of one example of display on a display screen of a preview-image display unit.

FIG. 2 is a model view of one example of display on a display screen 7a of the preview-image display unit 7. A process subject image (finished image) 10 and function setting items (menu items) 9 are displayed on the display screen 7a of the preview-image display unit 7. The function setting items (menu items) 9 include a menu 9a, execution of which depends on a place on the process subject image (finished image) 10. The menu 9a is displayed at the right of the screen as items of staple, punch, bookbinding margin, frame delete adjustment, stamp, page number, etc. The function setting items 9 also include a menu 9b, execution of which does not depends on image contents. The menu 9a is displayed at the left of the screen as items of output color, output density, paper, zoom, single-side/double-side, combining, sort/stack, background, etc.

The finished-image generating unit 6 generates a finished image, which represents a result given by subjecting image data (document image data) on each page of a document file stored in the image storing unit 3 to a printing process at the printing unit and to a post-process at the post-process unit on the basis of document characteristic values, which is an analysis result given by the image analyzing unit 4, and of setting contents, which is a set value that is determined for every setting item at the user interface unit 5. The generated finished-image data is put out on the preview-image display unit 7. The finished-image data generated by the finished-image generating unit 6 includes image data produced at each stage of processes, such as document image data (document raw image data) that is read at the document reading unit 2 by prescanning for reading a document before a print process or by main scanning for reading a document upon executing the print process, semi-processed image data that is the result of a process executed by the finished-image generating unit 6 only on the basis of document characteristic values, which is an analysis result given by the image analyzing unit 4, semi-processed data that is the result of a process executed by the finished-image generating unit 6 on the basis of document characteristic values, which is an analysis result given by the image analyzing unit 4, and of setting contents set at the user interface unit 5, and final finished-image data that is the final result given by the finished-image generating unit 6. The finished-image generating unit 6 also generates transparent finished-image data by further subjecting the finished-image data to a transparency/density adjusting process of adjusting the transparency of a non-image portion (background portion) of each page of the finished-image data to a predetermined transparency and adjusting the density of an image portion of each page of the finished-image data to a predetermined density. The finished-image generating unit 6 thus carries out the transparency/density adjusting process on the finished-image data to generate the transparent finished-image data. This adjustment process will be described in detail later.

When a document is a double-side document bearing front/back side images, the finished-image generating unit 6 turns a back-side image data into reversed image data by reversing the left/right sides of the image, and generates transparent finished-image data from the reversed image data.

The preview-image display unit 7 consists of, for example, a liquid crystal display, and the touch panel of the user interface unit 5 is superposed on the preview-image display unit 7. The preview-image display unit 7 is provided with a preview image display buffer having a structure shown in FIG. 3, and N pieces of transparent finished-image data are stored in the buffer. The preview-image display unit 7 thus sequentially stores each of N pages of finished-image data from the finished-image generating unit 6 in each layer of the preview image display buffer in the order of the first to Nth page.

Figure 3:
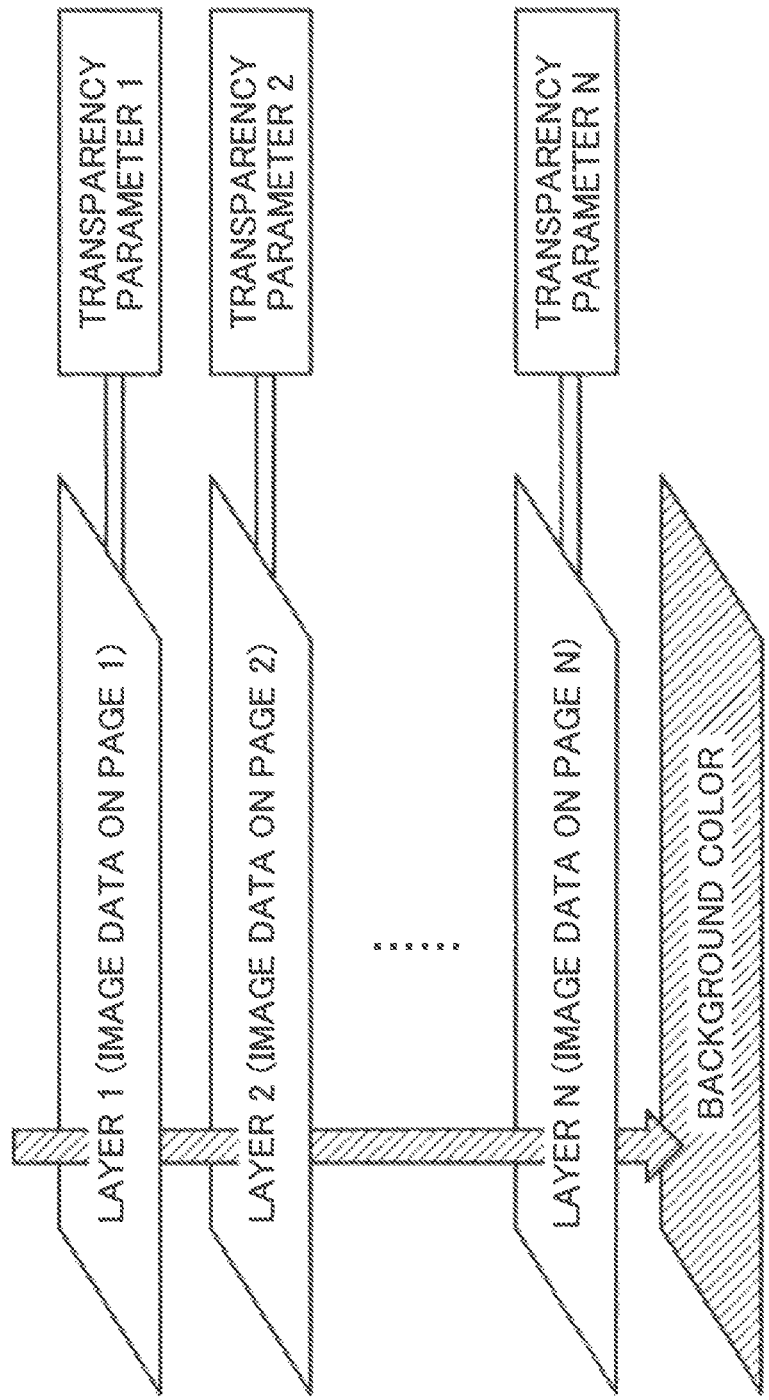
FIG. 3 is a model view of a structural example of transparent finished-image data in a preview image displaying buffer.

The finished-image generating unit 6 properly sets a transparent parameter value and a density parameter value (only the transparent parameter value is shown in FIG. 3) for each page (layer) of the finished-image data stored in the preview image display buffer, and carries out the transparency/density adjusting process to adjust the transparency of the non-image portion of each page of the finished-image data to a predetermined transparency, and adjust the density of the image portion of each page to a predetermined density. Thus, the finished-image data in the preview image display buffer is turned into transparent finished-image data. Specifically, the finished-image generating unit 6 sets a transparent parameter value for the non-image portion to, for example, 100% for each page (layer) of the finished-image data in the preview image display buffer, thus turns the non-image portion (background image) of every page into transparent. The finished-image generating unit 6, on the other hand, sets a density parameter value for the image portion to a predetermined parameter value of, for example, 100%, which means an image density on a document is kept as it is, for each page (layer) of the finished-image data in the preview image display buffer, so that the image portion of every page can be seen through the transparent non-image portion. The finished-image generating unit 6 is capable of adjusting a transparent parameter value for the non-image portion to any desired value ranging from 0% to 100%, where the smaller the transparent parameter value is, the higher the density, and the larger the transparent parameter value is, the lower the density is to render images in lower layers (later pages) visible in transparency. The finished-image generating unit 6 is also capable of adjusting a density parameter value for the image portion to any desired value ranging from 0%, for example, to 20%, 50%, 80%, 100%, 120%, etc., where the smaller the density parameter value is, the lower the density, and the larger the density parameter value is, the higher the density is. When a stack of pages of the finished image is displayed, the recognizability of the image portion gets higher as a density parameter value for the image portion gets larger. 0% density parameter value results in no image portion, and 100% density parameter value provides a document reading density at the document reading unit 2.

The preview-image display unit 7 displays a transparent finished image 10 on the display screen 7a in such a manner as shown in FIG. 2, where the transparent finished image 10 is made by stacking up all pages of the transparent finished-image data. As described above, the transparency of the non-image portion of the transparent finished-image data is set to a predetermined transparency parameter value of, for example, 100%, and the density of the image portion of the transparent finished-image data is set to a predetermined density parameter value of, for example, 100%. As a result, data (image portion) in layers lower than a certain layer is seen through in transparency according to the transparency (transparency parameter value) of pixel values at coordinates (x,Y) in the certain layer (page).

According to the image processing apparatus 1, the image processing unit (not shown) carries out an image process according to document characteristic values, which is an analysis result given by the image analyzing unit 4, and to final setting contents consisting of setting contents finally set at the user interface unit 5. The printing unit (not shown) prints an image on a paper on the basis of image data resulting from the image process and of print setting determined by the final setting contents. The post-processing unit (not shown) then carried out a post-process on the paper bearing the printed out image according to the final setting contents, after which the processed paper is ejected out.

The finished-image generating unit 6 may be incorporated into the image processing unit originally built in the image processing apparatus 1.

Now the effect obtained by the present embodiment is described. According to the image processing apparatus 1 of the present embodiment, a plurality of documents are set on the ADF of the document reading unit 2, and necessary setting is made at the user interface unit 5, then a start key is turned on. Upon turning on the start key, the documents are transferred from the ADF one by one to a reading position on the document reading unit 2, which reads the documents sequentially, and document image data read by the document reading unit 2 are stored temporarily in the image storing unit 3. Afterward, the finished-image generating unit 6 generates a transparent finished image, and each page of the transparent finished image 10 is stacked up sequentially to be displayed on the display screen 7a of the preview-image display unit 7.

Figure 4:
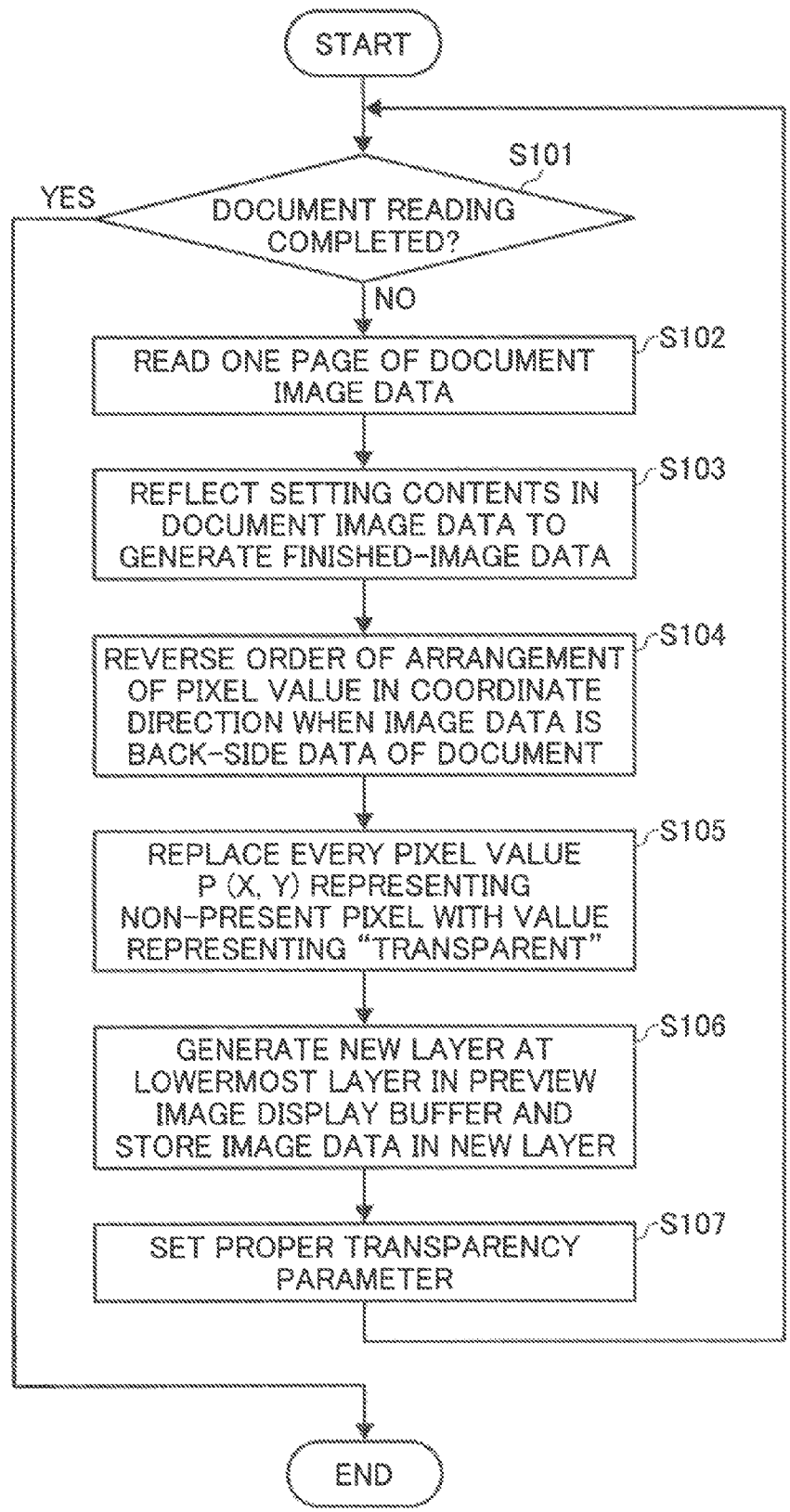
FIG. 4 is a flowchart of the flow of a transparent finished image display process.

The process of displaying the transparent finished image executed by the image processing apparatus 1 is described referring to a flowchart shown in FIG. 4. As shown in FIG. 4, when the document reading unit 2 starts reading documents, the image processing apparatus 1 checks to see whether reading of all documents has been finished (step S101).

When not all the document has been read (No at step S101), the ADF sends one page of document to the document reading unit 2, which then reads the one page of document. Subsequently, the read one page of document image data is stored in the image storing unit 3 (step S102).

The image processing apparatus 1 then reads one page of document image data out of the image storing unit 3, and causes the finished-image generating unit 6 to generate finished-image data from the document image data according to document characteristic values resulting from an analysis by the image analyzing unit 4 and to setting contents consisting of set values given by a user at the user interface unit 5 (step S103: finished-image generating unit).

The image processing apparatus 1 checks the one page of image data to see if it is back side image data on a double-side document, referring to an analysis result given by the image analyzing unit 4. When the image data is back side data, the image processing apparatus 1 reverses the order of arrangement of pixel values in the X coordinate direction on the image data to generate a reversed image having the left/right side (X direction) reversed from the original one (step S104). The image processing apparatus 1 checks every X, Y coordinate on the generated finished-image data to judge on whether a pixel value P (X, Y) represents a present pixel (pixel of an image portion presenting any contents of a character, photograph, etc.) or a non-present pixel (pixel of a non-image portion constituting the background of a document). Only the pixel value representing the non-present pixel is replaced with a value representing "transparent" (hereinafter such a value is simply called "transparent") (step S105).

Subsequently, the image processing apparatus 1 generates a new layer at the lowermost layer in the preview image display buffer of the preview-image display unit 7, and stores the finished-image data generated by the finished-image generating unit 6 in the newly generated layer (step S106).

After storing the finished-image data generated by the finished-image generating unit 6 in the new layer in the preview image display buffer of the preview-image display unit 7, the image processing apparatus 1 sets a transparency parameter value and a density parameter value for the finished-image data in the new layer, thus turns the finished-image data into transparent finished-image data, which is displayed on the display screen of the preview-image display unit 7 (step S107: transparent-finished-image generating unit, transparent-finished-image display unit).

After displaying a page of the transparent finished image 10 made from the transparent finished-image data, the image processing apparatus 1 returns to step S101 to check to see whether reading of all documents has been finished (step S101).

When not all the document has been read (No at step S101), the same process as described above is started from reading of the next document. Specifically, after finished-image data has been stored in a new layer in the preview image display buffer of the preview-image display unit 7, a transparency parameter value and a density parameter value for the finished-image data in the new layer are set to turn the finished-image data into transparent finished-image data. Afterward, a page of the transparent finished image 10 from the transparent finished-image data is superposed on a page of the transparent finished image 10 from previously generated transparent finished-image data, and then is displayed on the display screen 7a of the preview-image display unit 7 (step S102 to S107).

The image processing apparatus 1 sequentially carries out the above processes. The image processing apparatus 1 reads all pages of documents to generate all pages of a finished image, turns all pages of finished-image data into transparent finished-image data, and superposes a page of the transparent finished image 10 from the currently made transparent finished-image data on a page of the transparent finished image 10 from previously made transparent finished-image data. The image processing apparatus then displays, for example, the transparent finished image 10 consisting of stacked pages of the transparent finished image 10 as shown in FIG. 2 on the display screen 7a of the preview-image display unit 7 (step S101 to S107).

The image processing apparatus 1 ends a series of processes when the image processing apparatus 1 has read all pages of documents and displayed stacked pages of the transparent finished image 10.

As described above, according to the image processing apparatus 1 of the present embodiment, the finished-image generating unit 6 generates a page of a finished image for every page of a process subject image consisting of a plurality of pages, the finished image indicating the finished state of the process subject image that has been subjected to various processes according to document characteristic values, which is an analysis result on document characteristics given by the image analyzing unit 4, and to setting contents consisting of setting information given at the user interface unit 5. At least the non-image portion of each page of the finished image is adjusted in transparency to have a predetermined transparency to generate each page of a transparent finished image. All pages of the transparent finished image are then stacked up and displayed on the preview-image display unit 7.

A user, therefore, is allowed to look out pages of the transparent finished image in a state of transparency to check the result of processes according to setting contents executed on all pages of the process subject image consisting of a plurality of pages. This enables the user to easily check the overall layout of the transparent finished image, and to quickly search for a target page to check, thus offers improved usability.

According to the image processing apparatus 1 of the present embodiment, the finished-image generating unit 6 generates an image showing a finished state that has been subjected to a series of processes including an image process, a process of printing out an image having undergone the image process on a paper, and a post-process on the paper bearing the printed out image.

This allows a user to check the finished state resulting from the series of processes at a glance, thus offers improved usability.

In this case, the user can make setting on the series of processes via the user interface unit 5 after checking the transparent finished image 10 resulting from the series of processes. The user, therefore, can make setting for bringing an intended result more properly and easily.

According to the image processing apparatus 1 of the present embodiment, when a process subject image includes a front-side image and a back-side image of a double-side document, the finished-image generating unit 6 generates a reversed image from the back-side image, the reversed image being made by reversing the back-side image, and generates a finished image from the reversed image.

A transparent finished image, therefore, is displayed in the form of the front-side image and the back-side image of a double-side image in a state where both back-side/front-side images display their actual appearance faithfully. Thus, the overall structure of the transparent finished image can be checked more precisely.

After seeing the page-stacked transparent finished image 10 displayed on the preview-image display unit 7, a user may operate the user interface unit 5 to change or cancel setting contents for a specific page or all pages of the transparent finished image 10. In such a case, the finished-image generating unit 6 generates a new finished image based on new setting contents, and rewrites a finished image in the preview image display buffer of the preview-image display unit 7 to generate a new transparent finished image 10. The preview-image display unit 7 then displays the page-stacked transparent finished image 10 generated from the rewritten transparent finished-image data.

The user is, therefore, allowed to check a change in setting contents in a feedback process, thus allowed to make more proper setting simply and easily.

In displaying the transparent finished image 10 consisting of a plurality of stacked pages on the preview-image display unit 7, a page specifying image for specifying each page may be added to the transparent finished image 10.

Figure 5:
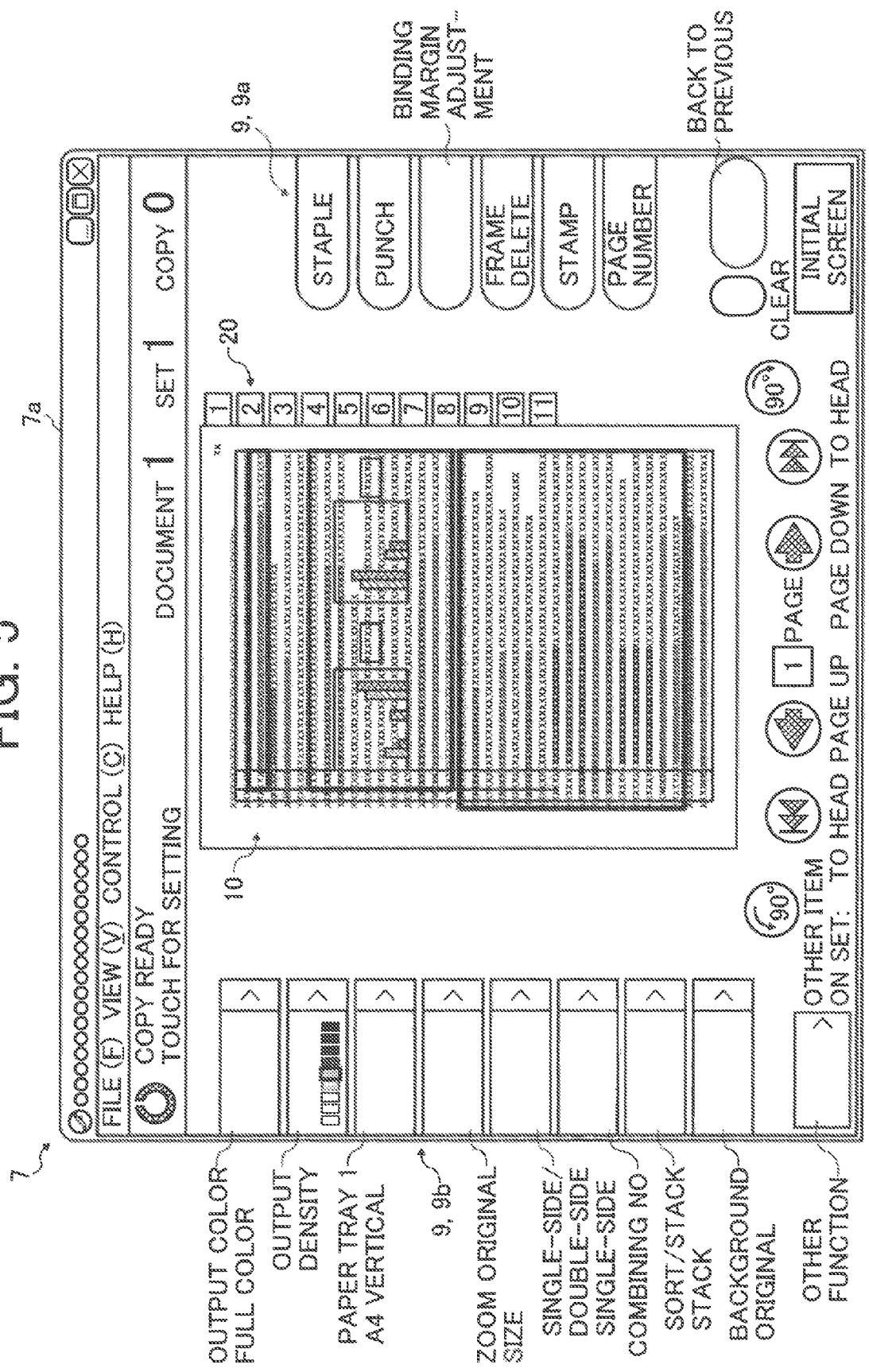
FIGS. 5 to 9 are front views of examples of a display on the display screen of the preview-image display unit.

For example, as shown in FIG. 5, a tag (page specifying image) 20 is added to the right end of each page of the transparent finished image 10, where the tag 20 indicates the page to which the tag 20 is added.

Addition of the tag 20 to each page of the transparent finished image 10 is carried out by the finished-image generating unit 6, which adds tag data, which is stored in advance in a memory, etc., to finished-image data when generating each page of the finished-image data from document image data.

This tag addition allows a user to carry out such an operation of specifying a tag added to a transfer destination page, using the touch panel, to transfer quickly to the page to be checked and displaying the page. This provides further improved usability.

According to the image processing apparatus 1 of the present embodiment, when the tag (page specifying image) 20 is added to each page of the transparent finished image 10, as shown in FIG. 5, the tag 20 of a page where a trouble occurs may be displayed in a highlighted state when the trouble concerning a process result occurs after each page of the transparent finished image 10 has been generated by user-set processes.

Figure 6:
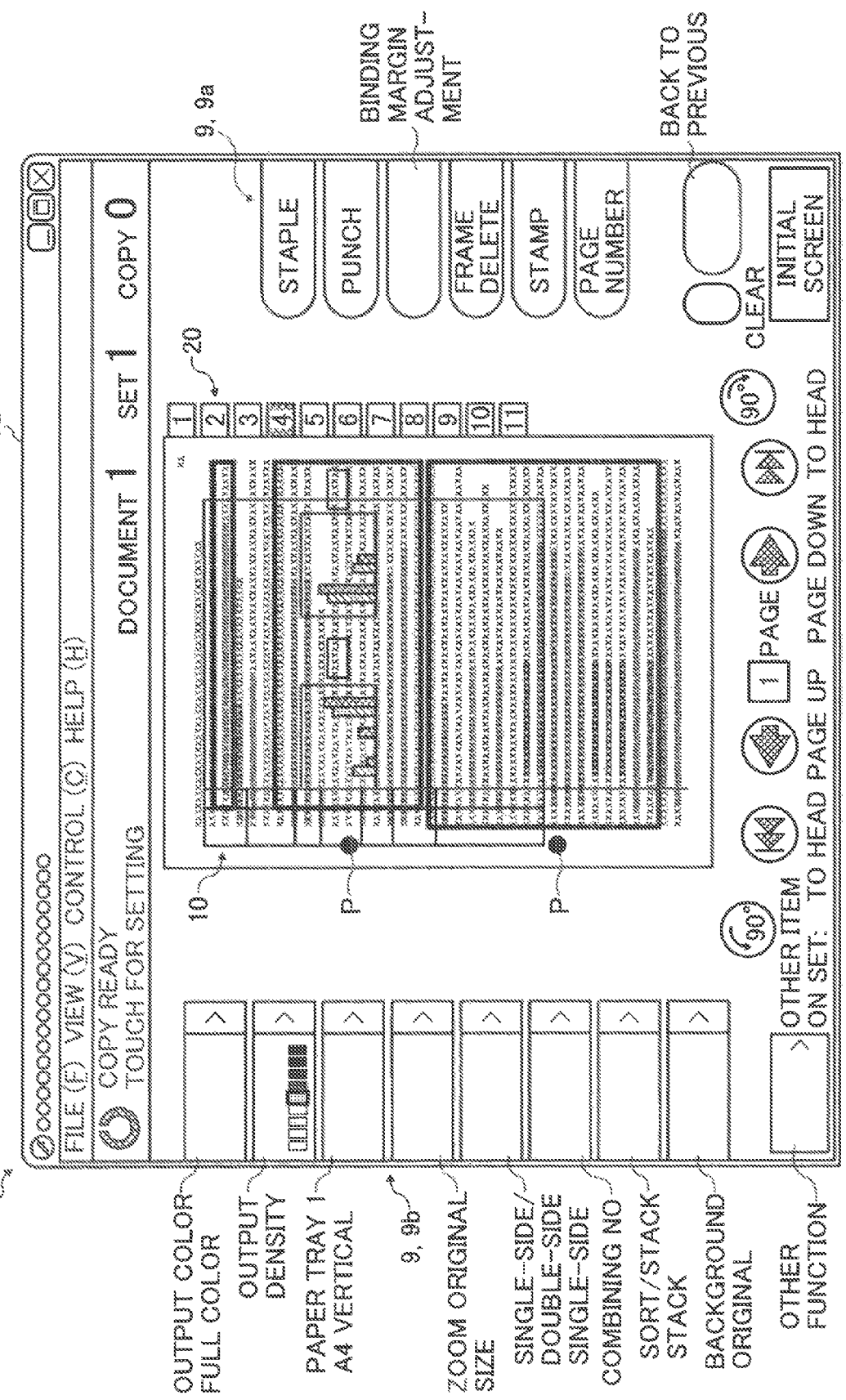

For example, when a stapling process and/or punching process is specified as a post-process and the finished-image generating unit 6 generates finished-image data according to setting contents including the stapling process and/or punching process, the finished-image generating unit 6 judges on whether an enough margin is present at a position where the stapling and/or punching process is carried out in carrying out processes according to the setting contents on the basis of document characteristic values and setting contents (presence or absence of margin size adjustment) obtained from the image analyzing unit 4. When an enough margin is not present to cause such a trouble as shown in FIG. 6 that a punched hole P depicted as a circular mark overlaps the image portion of the page 4 to lead to the elimination of a part of the image portion of the page 4 upon forming the punched hole P, the finished-image generating unit 6 puts the tag 20 of the page 4 into a state different from the state of the tags of other pages, for example, into a state of different color or being painted in a specific color for highlighting.

In this manner, a user can easily confirm a page where a trouble concerning a process result occurs, being able to quickly take a proper and necessary measure against the trouble.

The image processing apparatus 1 of the present embodiment may display a list of pages of partial images of a transparent finished image consisting of a plurality of stacked pages. In this case, the user interface unit 5 is provided with a partial image listing mode switch button (not illustrated), and the button is operated to select a partial image listing mode.

Figure 7:
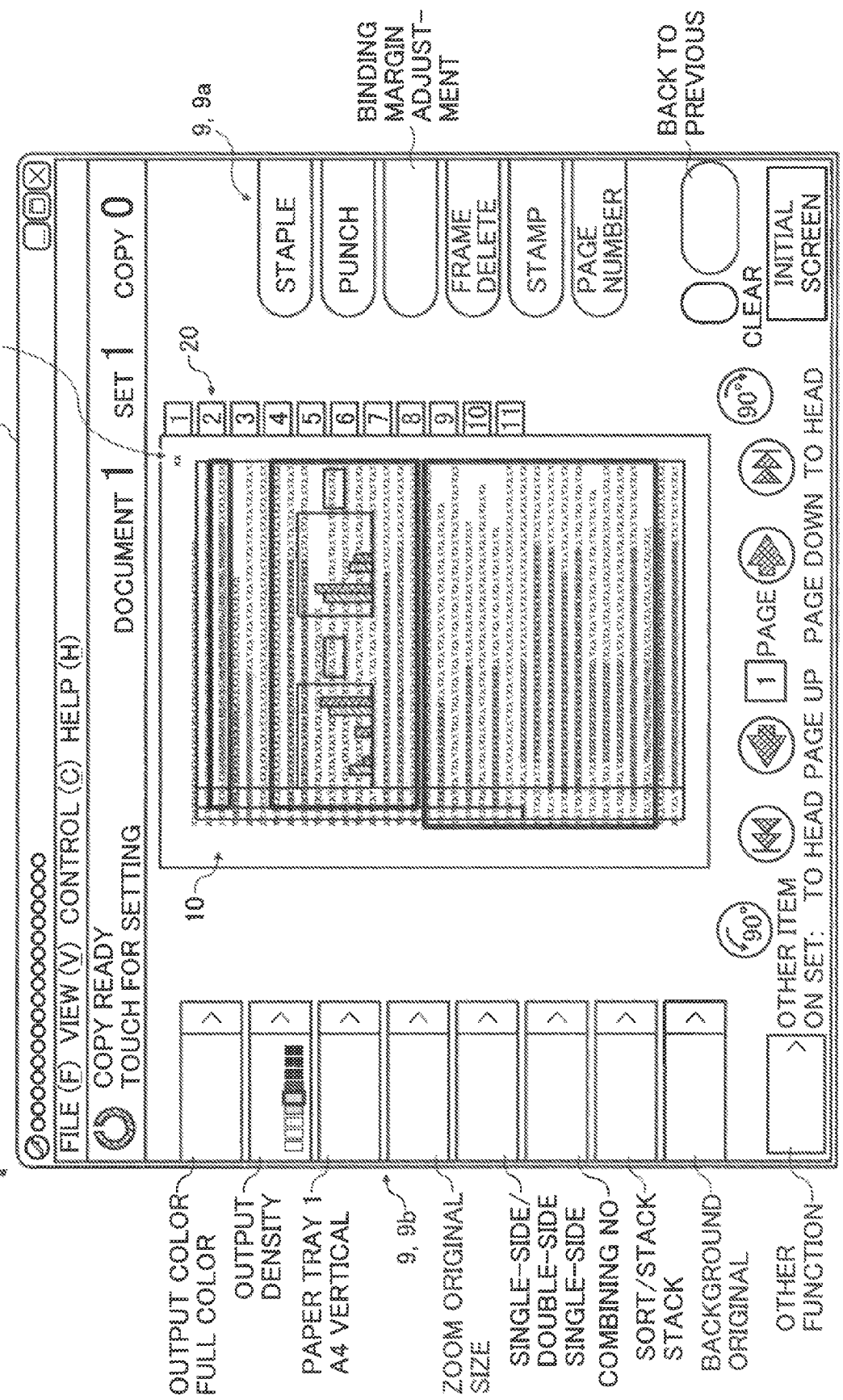
Figure 8:
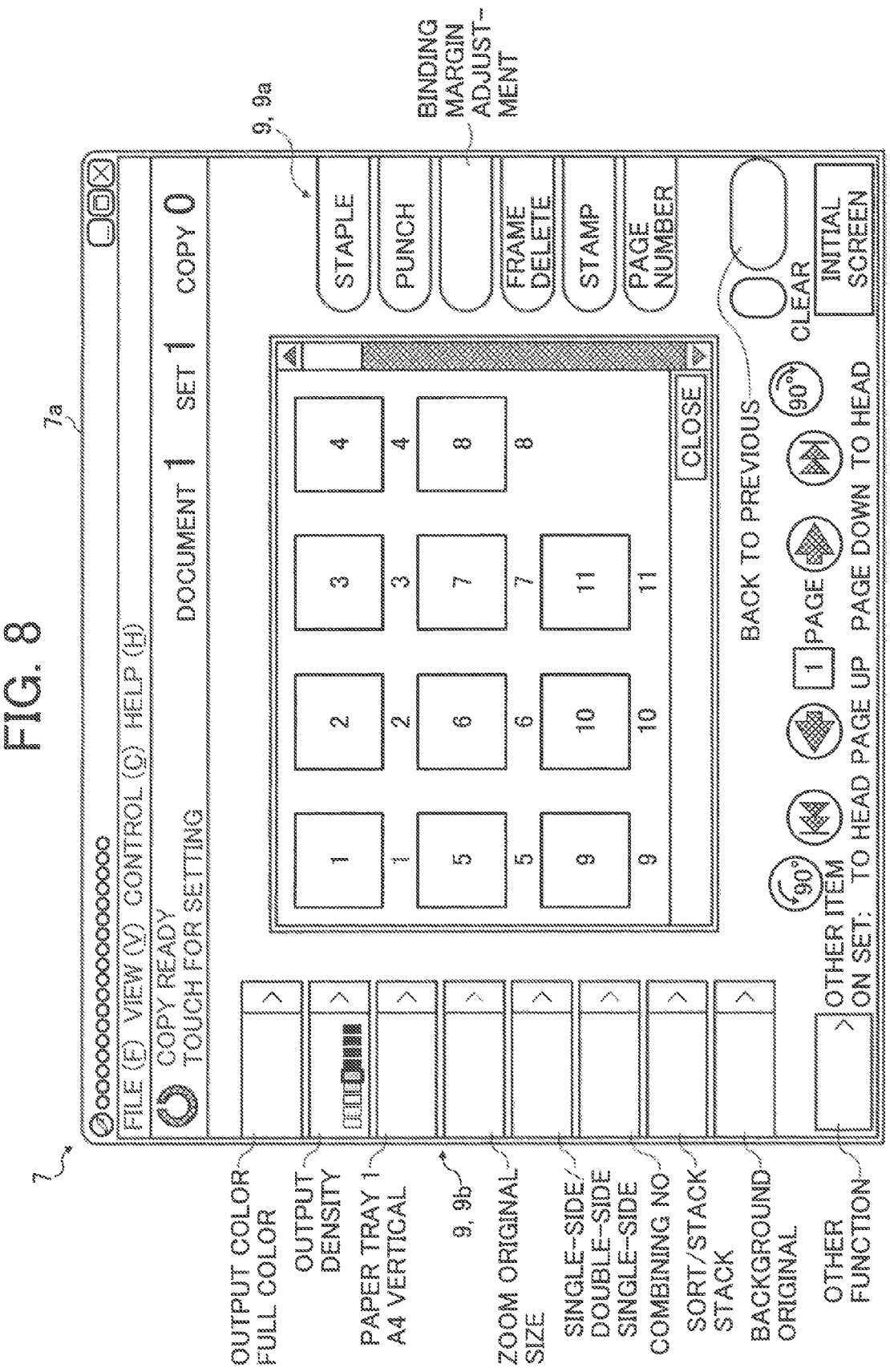

When the partial image listing mode is selected by operating the partial image listing mode switch button, the image processing apparatus 1 makes a judgment when a page-number-printed position 10b on the transparent finished image consisting of stacked pages is touched (specified), as shown in FIG. 7 (coordinates-specification judging unit). In this case, the finished-image generating unit 6 extracts an image (rectangle area image) in a predetermined small rectangle area (not limited to the rectangle area) having its center as the touched position (coordinate) from every page of the finished-image data, the rectangle area containing the image being defined as a checking area (checking-area-image extracting unit). The finished-image generating unit 6 then, for example, stores each page of the rectangle area image, which is arranged in the order of pages, in a new layer in the preview image display buffer of the finished image display unit 7. Then, only the pages of the rectangle area image (checking area image) in the new layer are displayed on the display screen 7a of the finished image display unit 7, as shown in FIG. 8 (checking image display unit). FIG. 8 indicates that each page of the finished image 10 is arranged correctly in the order of pages.

Figure 9:
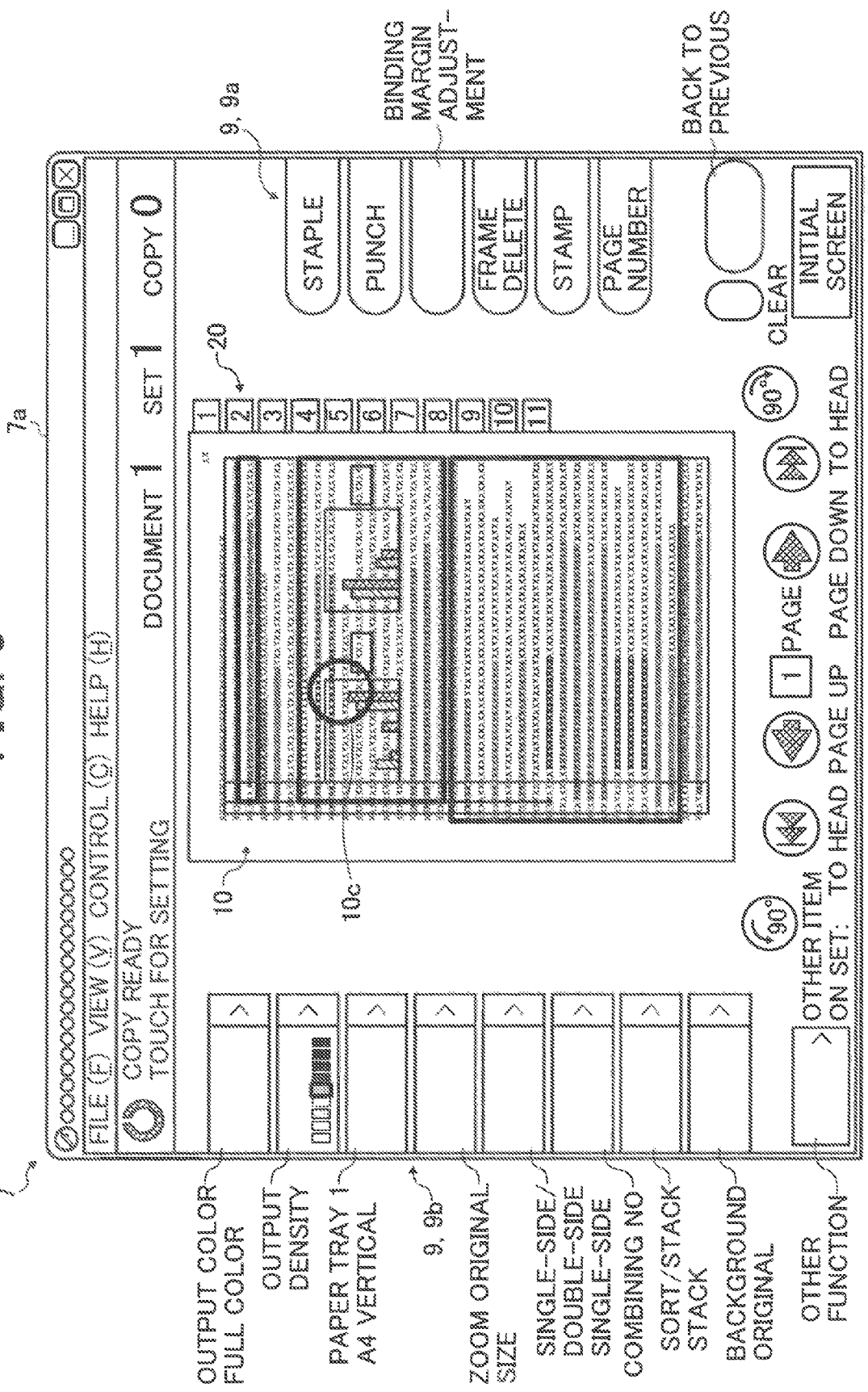
Figure 10:
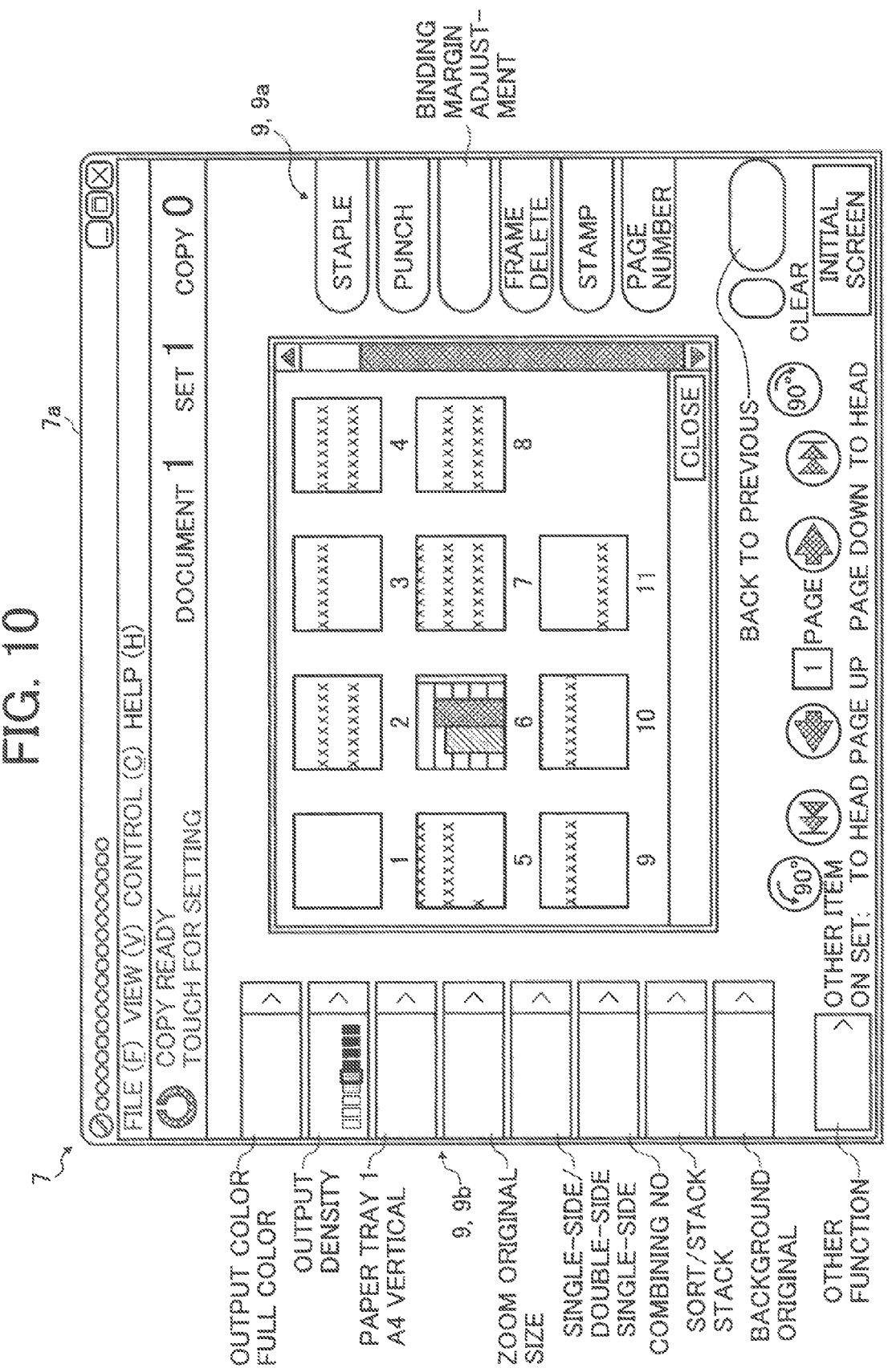
FIG. 10 is a front view of still another example of display on the display screen of the preview-image display unit.

The image processing apparatus 1 makes a judgment, for example, when a position 10c at a part of a graph display portion of the transparent finished image consisting of stacked pages (coordinate point on the display screen 7a indicated by a circular mark in FIG. 9) is touched (specified), as shown in FIG. 9. In this case, the finished-image generating unit 6 extracts an image (rectangle area image) in a predetermined small rectangle area (not limited to the rectangle area) having its center as the touched position from every page of the finished-image data. The finished-image generating unit 6 then, for example, stores each page of the rectangle area image, which is arranged in the order of pages, in a new layer in the preview image display buffer of the finished image display unit 7. Then, only the pages of the rectangle area image in the new layer are displayed on the display screen 7a of the finished image display unit 7, as shown in FIG. 10. FIG. 10 indicates that a graph is depicted in the page 6.

In this manner, the image processing apparatus 1 allows a user to recognize at a glance the presence or absence of a page bearing specific image contents and the page bearing such image contents, thus offers further improved usability.

The image processing apparatus 1 of the present embodiment may display only a predetermined number of pages precedent or subsequent to a centered predetermined target page of a transparent finished image for document image data, instead of displaying every page of the transparent finished image for the document image data consisting of a plurality of pages. The predetermined number of pages is provided as a partial page transparent finished image. Displaying only the several pages precedent or subsequent to the centered target page of the transparent finished image as the partial page transparent finished image is effective in searching for a specific contents page bearing a specific image contents (contents).

In this case, for example, the finished-image generating unit 6 generates pages of finished-image data for all pages of document image data, and sequentially stores each page of the finished-image data in each layer in the preview image display buffer of the preview-image display unit 7. When a target page is specified at the user interface unit 5, the finished-image generating unit 6 sets a transparent parameter value for the non-image portion to 100% and a density parameter value for the image portion to 0% for the pages of the finished-image data other than the predetermined number of pages precedent or subsequent to the centered specified target page of the finished-image data, thus turns the pages other than the predetermined number of pages into completely transparent with no image portion. Thus, an image made by stacking up the target page and the predetermined number of pages precedent or subsequent to the target page of the transparent finished image is provided as the partial page transparent finished image, and is displayed on the display screen 7a.

The finished-image generating unit 6 may vary a density parameter value set for the partial page transparent finished image consisting of the predetermined number of pages precedent or subsequent to the centered target page of the transparent finished image.

For example, when each two pages precedent or subsequent to a centered target page of the transparent finished image are displayed as a partial page transparent finished image, as shown in FIG. 11, a density parameter value for the target page is set to a maximum value (e.g. 100%), the same for each first page precedent or subsequent to the target page is set to a value about as half as the maximum (e.g. 50%), and the same for each second page precedent or subsequent to the target page is set to a minimum value (e.g. 20%). In a case shown in FIG. 11, the page 4 having a density parameter of 100% is a target page, and two pages of the transparent finished image having a density parameter of 50% and two pages of the transparent finished image having a density parameter of 20% are superposed on the target page in precedent or subsequent to the target page to form a partial page transparent finished image. In a case shown in FIG. 12, the page 6 having a density parameter of 100% is a target page, and two pages of the transparent finished image having a density parameter of 50% and two pages of the transparent finished image having a density parameter of 20% are superposed on the target page in precedent or subsequent to the target page to form a partial page transparent finished image. In a case shown in FIG. 13, a page 8 having a density parameter of 100% is a target page, and two pages of the transparent finished image having a density parameter of 50% and two pages of the transparent finished image having a density parameter of 20% are superposed on the target page in precedent or subsequent to the target page to form a partial page transparent finished image. In comparison with FIGS. 11, 13, FIG. 12 shows that two pages of the transparent finished image are stacked above the page 6, while two pages of the transparent finished image are stacked below the page 6, where the image of the page 6, which is given the maximum density and has a graph image, is easy to recognize.

As a result, a user is allowed to easily and quickly find a page bearing target contents image when scrolling pages of the transparent finished image at high speed to search for the page bearing the target contents image. This leads to further improved usability.

Figure 14:
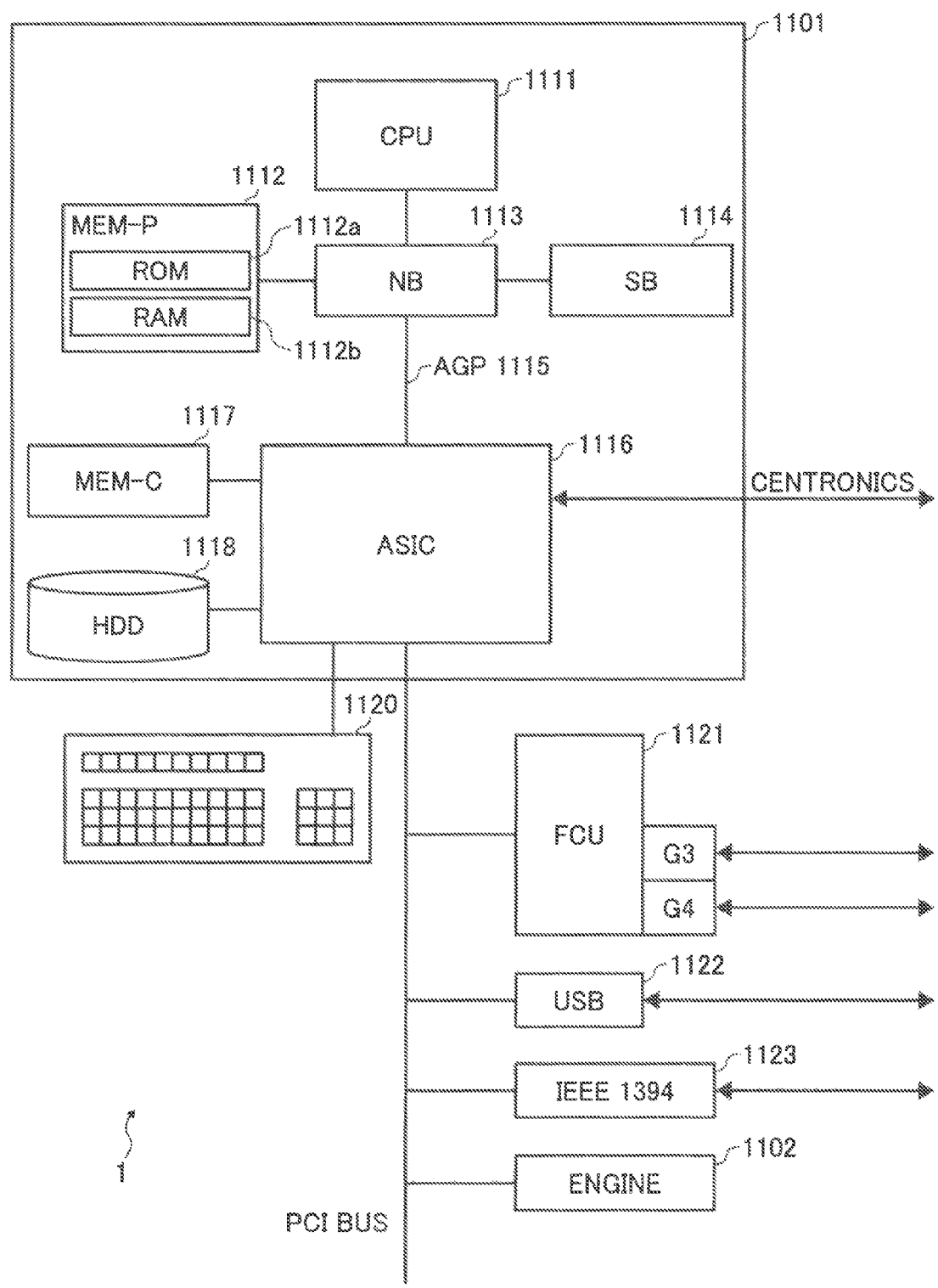
FIG. 14 is a block diagram of the hardware configuration of the image processing apparatus.

FIG. 14 is a block diagram of the hardware configuration of the image processing apparatus 1 according to the present embodiment. The image processing apparatus 1 is constructed as an MFP having multiple functions of faxing, scanning, etc. As shown in FIG. 14, the image processing apparatus 1 includes a controller 1101, and an engine unit 1102, which are interconnected via a peripheral component interconnect (PCI) bus. The controller 1101 controls the overall operation of the image processing apparatus 1, and also controls graphic performance, communication, and input from an operating unit 1120. The engine unit 1102 is such a printer engine connectible to the PCI bus as black/white plotter, 1-drum color plotter, 4-drum color plotter, scanner, or fax unit. In addition to an engine portion, such as plotter, the engine unit 1102 also includes an image processing portion serving for error diffusion or gamma conversion.

The controller 1101 has a CPU 1111, a system memory (MEM-P) 1112, a north bridge (NB) 1113, a south bridge (SB) 1114, an application-specific integrated circuit (ASIC) 1116, a local memory (MEM-C) 1117, and a hard disc drive (HDD) 1118. The NB 1113 is connected to the ASIC 1116 via an accelerated graphics port (AGP) bus 1115. The MEM-P 1112 has a ROM 1112a, and a RAM 1112b.

The CPU 1111 executes general control over the image processing apparatus 1, and has a chip set composed of the NB 1113, the MEM-P 1112, and the SB 1114. The CPU 1111 is connected to other units via the chip set.

The NB 1113 is a bridge that connects the CPU 1111 to the MEM-P 1112, to the SB 1114, and to the AGP bus 1115. The NB 1113 has a memory controller controlling reading/writing on the MEM-P 1112, a PCI master, and an AGP target.

The MEM-P 1112 is a system memory used for storing programs and data, for developing programs and data, for graphic operation by a printer, etc. The MEM-P 1112 consists of the ROM 1112a, and the RAM 1112b. The ROM 1112a is a read-only memory used for storing programs and data that controls the operation of the CPU 1111. The RAM 1112b is a readable/writable memory used for developing programs and data, for graphic operation by a printer, etc.

The SB 1114 is a bridge that connects the NB 1113 to PCI devices and peripheral devices. The SB 1114 is connected to the NB 1113 via the PCI bus, to which a network interface (I/F) unit is connected.

The ASIC 1116 is an integrated circuit (IC) for use in image processing, and has a hardware element for image processing. The ASIC 1116 plays a role as a bridge that interconnects the AGP bus 1115, the PCI bus, the HDD 1118, and the MEM-C 1117. The ASIC 1116 includes a PCI target, an AGP master, an arbiter (ARB) constituting the kernel of the ASIC 1116, a memory controller that controls the MEM-C 1117, a plurality of direct memory access controllers (DMACs) that rotate image data using a hardware logic, and a PCI unit that executes data transfer between the PCI unit and the engine unit 1102 via the PCI bus. The ASIC 1116 is connected to a fax control unit (FCU) 1121, to a universal serial bus (USB) 1122, and to an IEEE 1394 (the Institute of Electrical and Electronics Engineers 1394) I/F 1123 via the PCI bus.

The MEM-C 1117 is a local memory used as an image buffer for copying and as a code buffer. The HDD 1118 is a storage that accumulates image data, programs controlling the operation of the CPU 1111, font data, and forms.

The AGP bus 1115 is a bus I/F for a graphic accelerator card that is proposed to speed up graphic processes. The AGP bus 1115 provides direct access to the MEM-P 1112 at high throughput to allow high-speed performance of the graphic accelerator card.

The operating unit 1120 connected to the ASIC 1116 receives operational input from an operator, and sends information of the received operational input to the ASIC 1116.

An image displaying program and an image forming program executed by the image processing apparatus 1 of the present embodiment are preinstalled in the ROM, etc., and are provided for execution.

The image displaying program and image forming program executed by the image processing apparatus 1 of the present embodiment may be recorded on a computer-readable recording medium, such as a CR-ROM; a flexible disc (FD), a CD-R, or a digital versatile disc (DVD), as a file in an installable format or an executable format, and be provided for execution.

The image displaying program and image forming program executed by the image processing apparatus 1 of the present embodiment may be stored in a computer connected to a network, such the Internet, and be downloaded via the network for execution. The image displaying program and image forming program executed by the image processing apparatus 1 of the present invention may be provided or distributed via a network, such as the Internet.

The image processing apparatus 1 of the present embodiment is of a module structure that includes each unit described above (document reading unit 2, image storing unit 3, image analyzing unit 4, user interface unit 5, finished-image generating unit 6, and preview-image display unit 7). As the CPU (processor) reads the image displaying program and image forming program out of the ROM and executes the programs, each unit is loaded into the main memory to generate the document reading unit 2, the image storing unit 3, the image analyzing unit 4, the user interface unit 5, the finished-image generating unit 6, and the preview-image display unit 7 in the main memory.

According to the first embodiment, the image processing apparatus 1 of the present invention is provided in the form of an MFP, but the form of the image processing apparatus 1 in a practical application is not limited to such a compound machine. Various effects equal to the effects described above can be obtained by, for example, connecting an image forming device, such as printer, to a personal computer (PC), and installing a predetermined program in a memory unit, such as an HDD, of the PC, then causing the CPU of the PC to operate according to the installed program.

Figure 15:
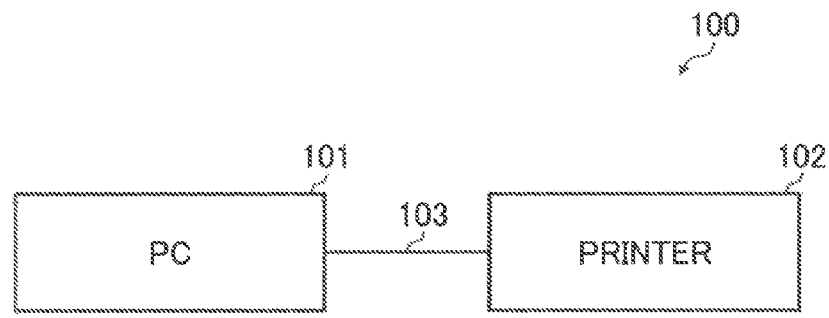
FIG. 15 is a block diagram of a schematic structural example of a printing system according to a second embodiment of the present invention.

FIG. 15 is a block diagram of a schematic structural example of a printing system 100 according to a second embodiment of the present invention. The printing system 100 shown in FIG. 15 includes a PC 101 that sends out a print job including print data and print conditions for printing out the print data, a printer 102 that prints the print data, and a cable 103 that connects the PC 101 to the printer 102.

The PC 101 sends print data corresponding to a prepared document and print condition data set for printing of the document (paper direction, double-side, combining, bookbinding, stapling, punching, zoom, etc.), both data being sent as a print job, to the printer 102.

The printer 102 prints out the print data according to the print job sent from the PC 101. Specifically, the printer 102 prints out the print data included in the print job on a medium, such as paper, according to the print condition data included in the print job (paper direction, double-side, combining, bookbinding, stapling, punching, zoom, etc.).

The specific constitution of the PC 101 and of the printer 102 will now be described in order.

Figure 16:
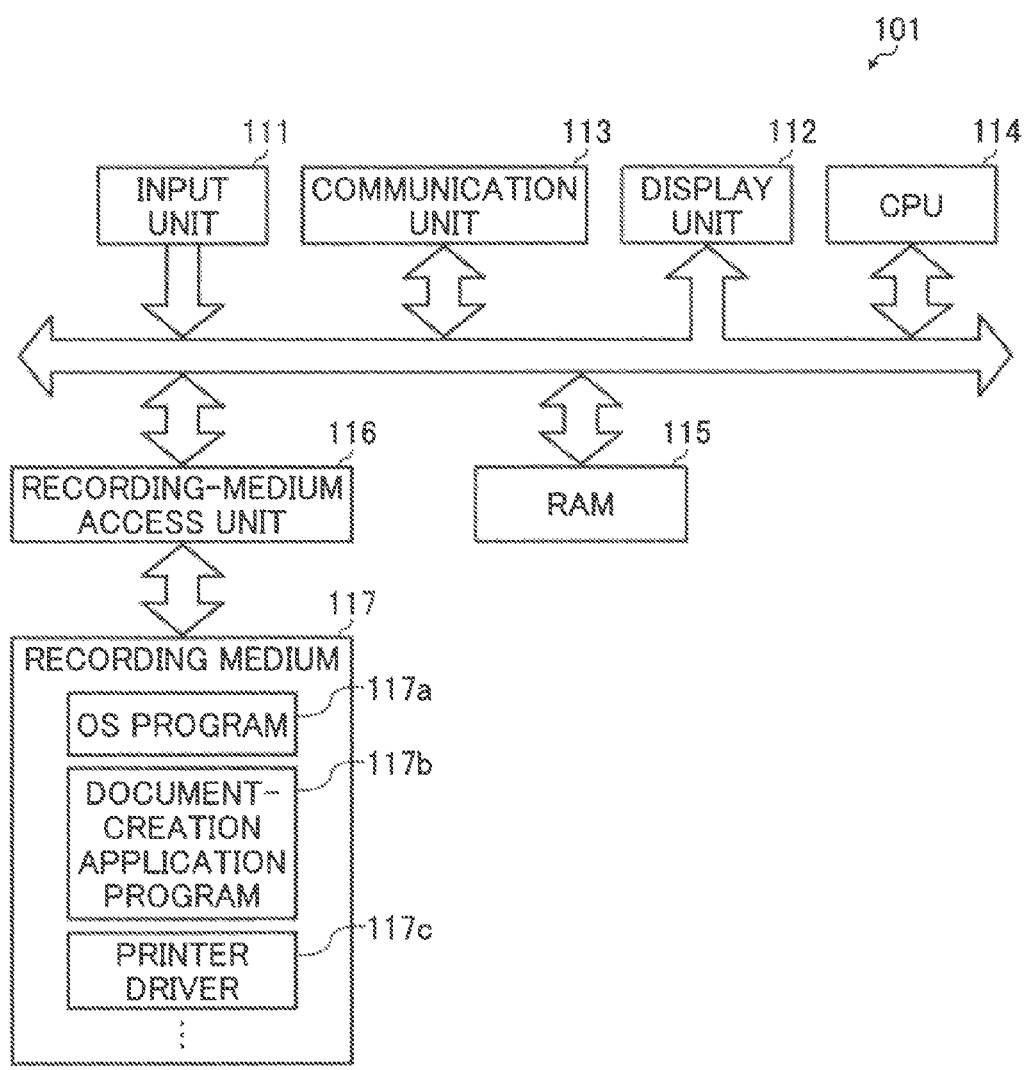
FIG. 16 is a block diagram of the schematic structure of a PC.

FIG. 16 is a block diagram of the schematic structure of the PC 101. As shown in FIG. 16, the PC 101 includes an input unit 111 for data input, a communication unit 113 for data communication, a CPU 114 that executes control over the entire part of the PC 101, a RAM 115 that is used as a work area for the CPU 114, a recording-medium access unit 116 that writes and reads data in and out of a recording medium 117, and the recording medium 117 that stores various programs for operating the CPU 114.

The input unit 111 includes a keyboard having cursor key, numerical input keys, various functional keys, etc., and a mouse or slice pad for selecting a key on the display screen of a display unit 112. The input unit 111 is a user I/F for a user to give the CPU 114 an operational command or input data.

The display unit 112 consists of a CRT or LCD, and makes display according to display data input from the CPU 114. The communication unit 113 handles data communication with external equipment, and executes data communication, for example., with the printer 102, etc. via the cable 103.

The CPU 114 is a central control unit that controls the entire part of the PC 101 according to programs stored in the recording medium 117. The CPU 114 is connected to the input unit 111, to the display unit 112, to the communication unit 113, to the RAM 115, and to the recording-medium access unit 116. The CPU 114 controls data communication, readout of an application program through access to a memory or reading/writing of various data, data/command input, display, etc. The CPU 114 sends print data input from the input unit 111 and print condition data for the print data, both data being sent as a print job, to the printer 102 via the communication unit 113.

The RAM 115 has a work memory that stores a specified program, an input instruction, input data, a process result, etc, and a display memory that temporarily stores display data to be put out on the display screen of the display unit 112.

The recording medium 117 stores various programs and data including an OS program 117a (e.g. WINDOWS™, etc.) that can be executed by the CPU 114, a document-creation application program 117b, and a printer driver 117c operable on the printer 102. The recording medium 117 includes, for example, an optical, magnetic, or electric-recording medium, such as an FD, an HD, a CD-ROM, a DVD-ROM, a magneto-optical (MO) disk, and a PC card. The various programs are put in a data format readable to the CPU 114, and are stored in the recording medium 117. The programs are recorded beforehand on the recording medium in some cases, or are downloaded via a communication line and are stored in the recording medium in other cases. The programs can be distributed via the communication line.

Figure 17:
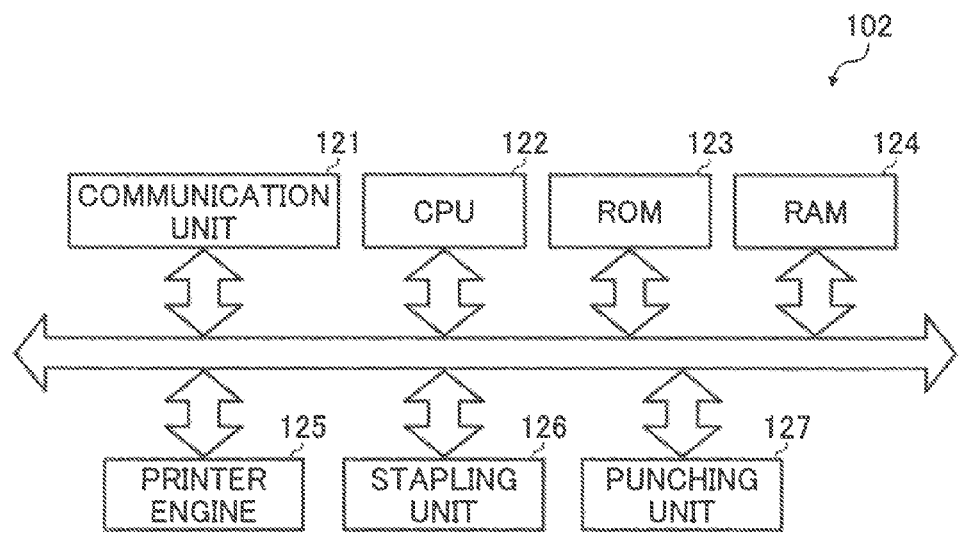
FIG. 17 is a block diagram of the schematic structure of a printer.

FIG. 17 is a block diagram of the schematic structure of the printer 102. As shown in FIG. 17, the printer 102 includes a communication unit 121 that executes data communication, a CPU 122 that executes control over the whole of the printer 102, a ROM 123 that stores various control programs for running the CPU 122, a RAM 124 that temporarily stores print data and print condition data included in a print job, which is input from a work area for the various control programs, from the PC 101, etc., a printer engine 125 that prints the print data on a transfer paper, a stapling unit 126 that staples papers bearing printed print data, and a punching unit 127 that punches a hole on the transfer paper bearing the printed print data. The printer 102 has a double-side function, a punching function, a stapling function, etc.

The communication unit 121 handles data communication with external equipment, and, for example, communicates with the PC 101 through data exchange.

The CPU 122 is a central control unit that controls the entire part of the printer 102 according to the various control programs stored in the ROM 123. The CPU 122 is connected to the communication unit 121, to the ROM 123, to the RAM 124, to the printer engine 125, to the stapling unit 126, and to the punching unit 127. The CPU 122 controls data communication, printer operation, etc.

The ROM 123 stores the various control programs for running the CPU 122, parameters used for processes by the control programs, etc. The RAM 124 has a work memory that stores a specified control program, a process result, received print data, etc.

The printer engine 125 is a printer engine employing an electrophotographic method, which is a unit that prints print data on a transfer paper. The printer 102 may employ various printing methods other than the electrophotographic method, such as ink-jet method, sublimation-type heat transfer method, silver salt photographic method, direct thermographic method, and melt-type heat transfer method.

The printer driver 117c is a software program that is so designed that a program can be run relative to a specific program on the printer 102 without being troubled with the hardware and/or internal language of the printer 102. The printer driver 117c controls the printer 102, and executes output data processing, etc.

Pursuant to the printer driver 117c, the CPU 114 of the PC 101 executes such operations as generation and display of an expected finished image on the basis of print data and print condition data for the print data, both data being input from the input unit 111, and transfer of print data made by the document-creation application program 117b to the printer 102.

Figure 18:
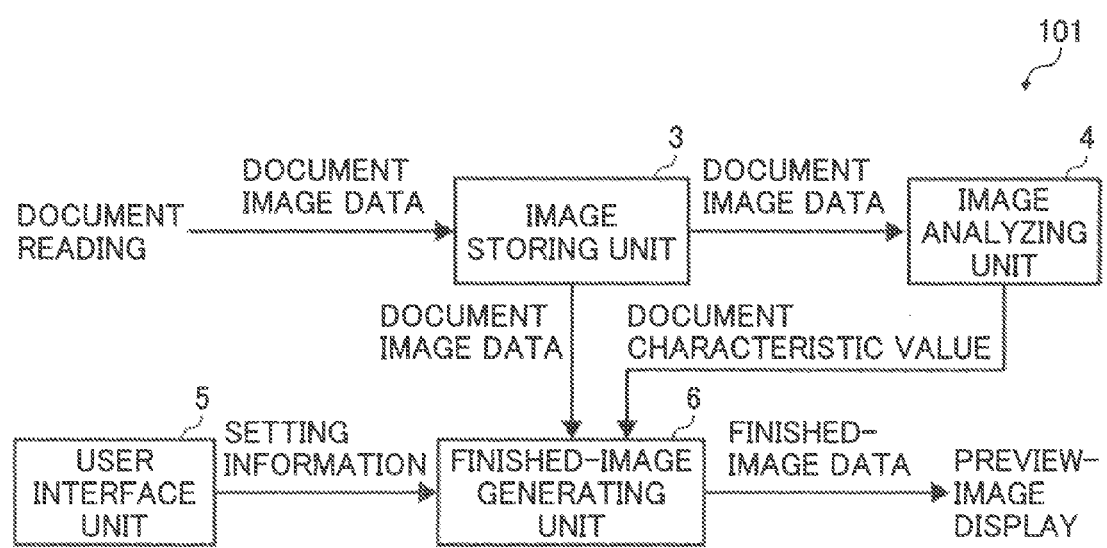
FIG. 18 is a block diagram of the main components of the PC.

As the CPU 114 operates in pursuant to the printer driver 117c, the PC 101 comes to have the image storing unit 3, the memory analyzing unit 4, the user interface unit 5, and the finished-image generating unit 6, as shown in FIG. 18.

The PC 101, therefore, comes to have the same system configuration as that of the image processing apparatus 1 shown in FIG. 1 to offer the same various effects as explained in the first embodiment when the CPU 114 operates in pursuant to the printer driver 117c.

Figure 19:
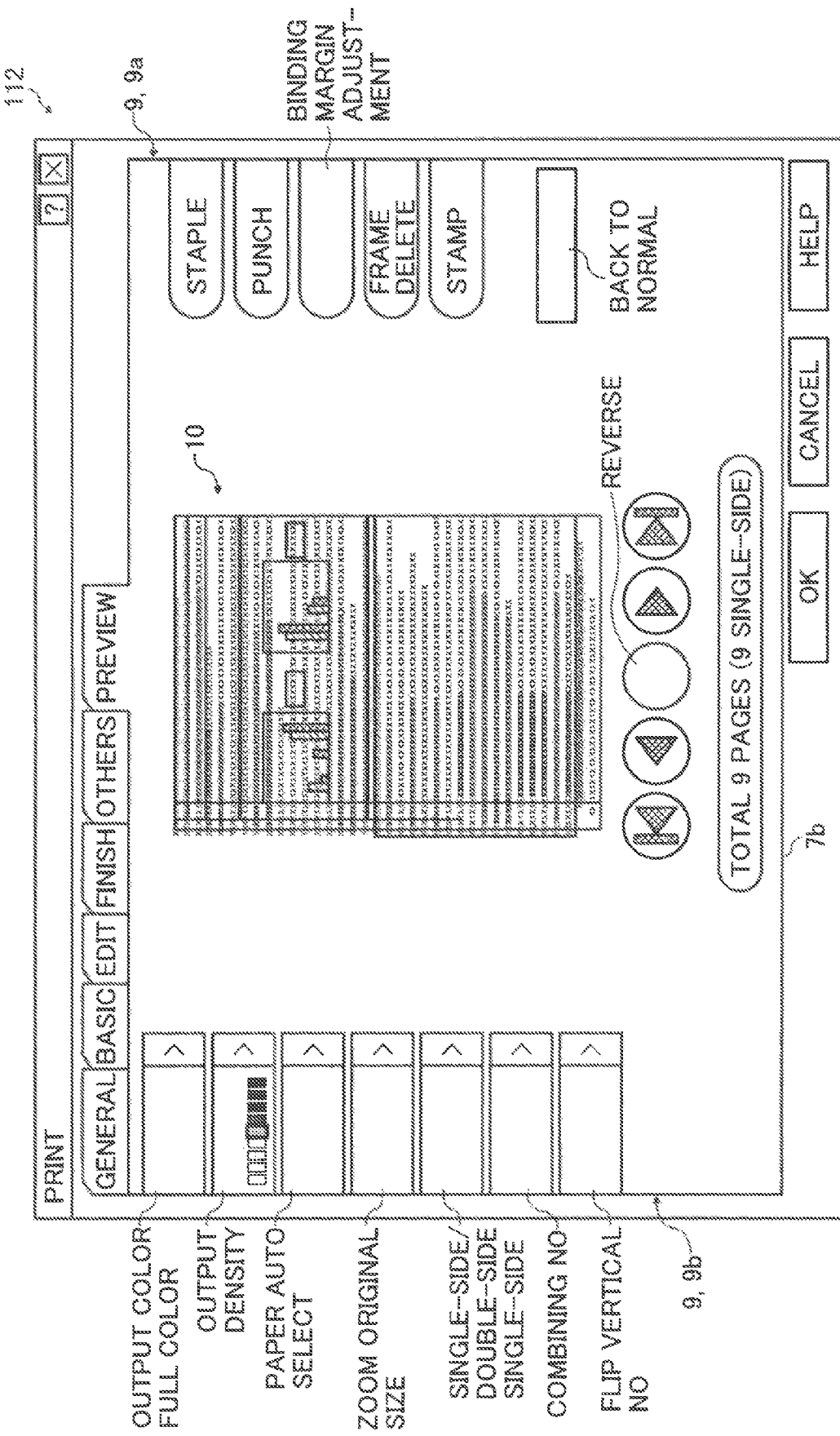
FIG. 19 is a front view of one example of a display screen produced by a printer driver.

FIG. 19 is a front view of one example of a display screen produced by the printer driver 117c. The screen shown in FIG. 19 is a screen that is displayed when the start of the printer driver 117c is selected on a display screen of the document-creation application program 117b, the start screen of the OS program 117a, etc. The screen shown in FIG. 19 allows a selection of a preview setting screen 7b (equivalent to the display screen 7a of the preview-image display unit 7 of the image processing apparatus 1) for generating/displaying an expected finished image based on print data and print condition data for the print data, both data being sent from the input unit 111, in addition to a selection of a basic condition setting screen, an editing condition setting screen, a finishing condition setting screen, etc.

According to the present embodiment, operation of the CPU 114 of the PC 101 in pursuant to the printer driver 117c results in display of the preview setting screen 7bfor generating/displaying an expected finished image based on print data and print condition data for the print data, both data being sent from the input unit 111. The way of displaying the preview setting screen 7b, however, is not limited to the above case. The preview setting screen 7b may be displayed by operating the CPU 114 of the PC 101 in pursuant to the document-creation application program 117b or the OS program 117a.

While the present invention provided by the inventor has been described in detail with reference to the preferred embodiments, the above description is not intended to limit the present invention. Various modifications of the embodiments will be possible as far as the modifications fall within the true scope of the invention.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a finished-image generating unit configured to generate a finished image showing a result of a process performed on a target image according to various function setting items;
a transparent-finished-image generating unit configured to generate, when the target image extends to a plurality of pages, a transparent finished image using an adjustable transparent parameter value from a continuous range of adjustable transparent parameter values to adjust a transparency of a non-image portion of each of the pages of the finished image to a predetermined transparency; and
a transparent-finished-image display unit configured to form the transparent finished image in a stack, and to display a stacked transparent finished image on a display unit such that an image portion of the transparent finished image is seen through the non-image portion,
wherein the process performed on the target image includes calculating characteristic values of the target image, the characteristic values including a document state characteristic value, an image characteristic value, and a layout characteristic value.

2. The image processing apparatus of claim 1, wherein the process executed on the target image according to the various function setting items is a series of processes including an image process, a process of recording a processed image on a recording medium, and a post-process on the recording medium.

3. The image processing apparatus of claim 1, wherein the transparent-finished-image generating unit generates a predetermined number of pages of the transparent finished image for the target image before and after a desired target page, the target page being arranged in a center of the predetermined number of pages.

4. The image processing apparatus of claim 3, wherein the transparent-finished-image generating unit, when there is an increase or a decrease in the number of pages from the target page, changes an image density of an image portion of the predetermined number of pages of the transparent finished image before and after the desired target page.

5. The image processing apparatus of claim 1, wherein when the target image is a double-sided document including a front-side image and a back-side image, the finished-image generating unit reverses the back-side image and generates the finished image for the reversed back-side image.

6. The image processing apparatus of claim 1, wherein the finished-image generating unit adds a page identifying image to each of the pages of the finished image to identify each of the pages.

7. The image processing apparatus of claim 6, wherein when a trouble occurs on the finished image, the finished-image generating unit highlights the page identifying image corresponding to a page where the trouble occurs.

8. The image processing apparatus of claim 1, further comprising:
a coordinate-specification judging unit configured to judge whether an optional coordinate of the transparent finished image displayed on the display unit is specified via an operation unit;
a checking-area-image extracting unit configured to extract, when the coordinate-specification judging unit judges that the optional coordinate is specified, a checking area image having a predetermined dimension centering around the specified optional coordinate from all of the pages of the finished image; and a checking-area-image display unit configured to arrange the extracted checking area images in a predetermined order and to display the arranged checking area images on the display unit in a list.

9. The image processing apparatus of claim 8, wherein the operation unit is a touch panel provided on the display unit.

10. A computer-readable medium storing computer readable instructions thereon for overlaying images in a stack, the computer-readable instructions when executed by a computer cause the computer to perform a method comprising:

generating a finished image showing a result of a process performed on a target image according to various function setting items;

generating, when the target image extends to a plurality of pages, a transparent finished image using an adjustable transparent parameter value from a continuous range of adjustable transparent parameter values to adjust a transparency of a non-image portion of each of the pages of the finished image to a predetermined transparency;

forming the transparent finished image in a stack; and displaying a stacked transparent finished image such that an image portion of the transparent finished image is seen through the non-image portion, wherein the process performed on the target image includes calculating characteristic values of the target image, the characteristic values including a document state characteristic value, an image characteristic value, and a layout characteristic value.

11. A method for overlaying images in a stack, the method comprising:

generating, at finished-image generating unit, a finished image showing a result of a process performed on a target image according to various function setting items;

generating, at a transparent-finished-image generating unit, when the target image extends to a plurality of pages, a transparent finished image using an adjustable transparent parameter value from a continuous range of adjustable transparent parameter values to adjust a transparency of a non-image portion of each of the pages of the finished image to a predetermined transparency;

forming, at a transparent-finished-image displaying unit, the transparent finished image in a stack; and displaying, at a transparent-finished-image displaying unit, a stacked transparent finished image such that an image portion of the transparent finished image is seen through the non-image portion, wherein the process performed on the target image includes calculating characteristic values of the target image, the characteristic values including a document state characteristic value, an image characteristic value, and a layout characteristic value.

12. The image processing apparatus of claim 1, wherein the document state characteristic value includes the number of documents and a document side.

13. The image processing apparatus of claim 1, wherein the image characteristic value includes a type of image, a used color, an image density, a pixel density and a used character size.

14. The image processing apparatus of claim 1, wherein the layout characteristic value includes a document direction, a document size, a margin size and layout information.

15. The image processing apparatus of claim 1, wherein the adjustable transparent parameter value is any value within the range of 0% to 100%.

16. The image processing apparatus of claim 1, wherein the process performed on the target image uses setting information provided via an operation unit.

17. The image processing apparatus of claim 1, wherein the finished-image generating unit generates a new finished image based on new settings when the stacked transparent finished image is modified via an operation unit, the new finished image being formed into a stack and displayed by the transparent-finished-image display unit.

* * * * *